(12) United States Patent
Tegg et al.

(10) Patent No.: US 12,484,947 B2
(45) Date of Patent: Dec. 2, 2025

(54) PULMONARY VEIN ISOLATION BALLOON CATHETER

(71) Applicant: St. Jude Medical, Cardiology Division, Inc., St. Paul, MN (US)

(72) Inventors: Troy T. Tegg, Elk River, MN (US); Salo Arias, Brooklyn Park, MN (US); Derek C. Sutermeister, Ham Lake, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 776 days.

(21) Appl. No.: 16/758,793

(22) PCT Filed: Oct. 15, 2018

(86) PCT No.: PCT/US2018/055944
§ 371 (c)(1),
(2) Date: Apr. 23, 2020

(87) PCT Pub. No.: WO2019/083765
PCT Pub. Date: May 2, 2019

(65) Prior Publication Data
US 2021/0177483 A1    Jun. 17, 2021

Related U.S. Application Data

(60) Provisional application No. 62/578,320, filed on Oct. 27, 2017.

(51) Int. Cl.
*A61B 18/00* (2006.01)
*A61B 18/02* (2006.01)

(52) U.S. Cl.
CPC .... *A61B 18/02* (2013.01); *A61B 2018/00172* (2013.01); *A61B 2018/00255* (2013.01);
(Continued)

(58) Field of Classification Search
CPC .......... A61B 18/02; A61B 2018/00172; A61B 2018/00178; A61B 2018/0022; A61B 2018/00255; A61B 2018/00375; A61B 2018/00577; A61B 2018/00791; A61B 2018/00821; A61B 2018/00839; A61B 2018/0212; A61B 2218/002;
(Continued)

(56) References Cited

U.S. PATENT DOCUMENTS

2003/0028182 A1\* 2/2003 Abboud .................. A61B 18/02
606/21
2005/0215989 A1\* 9/2005 Abboud .................. A61B 18/02
606/41
(Continued)

FOREIGN PATENT DOCUMENTS

WO    2013159066 A1    10/2013
WO    2015047961 A2    4/2015
(Continued)

*Primary Examiner* — Khadijeh A Vahdat
(74) *Attorney, Agent, or Firm* — DENTONS Durham Jones Pinegar

(57) ABSTRACT

The instant disclosure relates to electrophysiology catheters for tissue ablation. In particular, the instant disclosure relates to a cryogenic ablation balloon with a catheter handle that interfaces with capital equipment.

11 Claims, 13 Drawing Sheets

(52) U.S. Cl.
CPC ............ *A61B 2018/00375* (2013.01); *A61B 2018/00577* (2013.01); *A61B 2018/00821* (2013.01); *A61B 2018/0212* (2013.01); *A61B 2218/002* (2013.01); *A61B 2218/007* (2013.01)

(58) Field of Classification Search
CPC ...... A61B 2218/007; A61B 2034/2051; A61B 2090/064
See application file for complete search history.

(56) References Cited

U.S. PATENT DOCUMENTS

| | | | | |
|---|---|---|---|---|
| 2006/0030843 | A1* | 2/2006 | Lane | A61B 18/02 606/23 |
| 2009/0287203 | A1 | 11/2009 | Mazzone et al. | |
| 2010/0130970 | A1* | 5/2010 | Williams | A61B 18/02 606/21 |
| 2012/0029494 | A1* | 2/2012 | Wittenberger | A61B 18/02 607/113 |
| 2014/0058369 | A1 | 2/2014 | Hon | |
| 2014/0228820 | A1* | 8/2014 | Blaskowski | A61B 17/00 606/1 |
| 2015/0216581 | A1 | 8/2015 | Duong et al. | |
| 2020/0085483 | A1 | 3/2020 | Olson et al. | |
| 2020/0085484 | A1 | 3/2020 | Tegg et al. | |

FOREIGN PATENT DOCUMENTS

| | | |
|---|---|---|
| WO | 2019083764 A1 | 5/2019 |
| WO | 2019084439 A1 | 5/2019 |
| WO | 2019084442 A1 | 5/2019 |

* cited by examiner

A-A

B-B

A-A

A-A

B-B

B-B

A-A

PULMONARY VEIN ISOLATION BALLOON CATHETER

CROSS-REFERENCE TO RELATED APPLICATION

This application claims the benefit of U.S. provisional application No. 62/578,320, filed 27 Oct. 2017, which is hereby incorporated by reference as though fully set forth herein.

BACKGROUND a. Field

The instant disclosure relates to catheters, in particular catheters for conducting ablation therapy within a heart. In one embodiment, the instant disclosure relates to a catheter for treating cardiac arrhythmias by ablating in the vicinity of pulmonary venous tissue using a balloon filled with cryogenic fluid.

b. Background Art

The human heart routinely experiences electrical impulses traversing its many surfaces and ventricles, including the endocardial chamber. As part of each heart contraction, the heart depolarizes and repolarizes, as electrical currents spread across the heart and throughout the body. In healthy hearts, the surfaces and ventricles of the heart will experience an orderly progression of depolarization waves. In unhealthy hearts, such as those experiencing atrial arrhythmia, including for example, ectopic atrial tachycardia, atrial fibrillation, and atrial flutter, the progression of the depolarization wave becomes chaotic. Arrhythmias may persist as a result of scar tissue or other obstacles to rapid and uniform depolarization. These obstacles may cause depolarization waves to electrically circulate through some parts of the heart more than once. Atrial arrhythmia can create a variety of dangerous conditions, including irregular heart rates, loss of synchronous atrioventricular contractions, and blood flow stasis. All of these conditions have been associated with a variety of ailments, including death.

Intravascular catheters are used in a variety of diagnostic and/or therapeutic medical procedures to correct conditions such as atrial arrhythmia, including for example, ectopic atrial tachycardia, atrial fibrillation, and atrial flutter. Typically in a procedure, an intravascular catheter is manipulated through a patient's vasculature to, for example, a patient's heart, and carries one or more electrodes which may be used for mapping, ablation, diagnosis, or other treatments. Where an ablation therapy is desired to alleviate symptoms including atrial arrhythmia, an ablation catheter imparts ablative energy to cardiac tissue to create a lesion in the cardiac tissue. The lesioned tissue is less capable of conducting electrical impulses, thereby disrupting undesirable electrical pathways and limiting or preventing stray electrical impulses that may cause arrhythmias. The ablation catheter may utilize ablative energy including, for example, radio frequency (RF), cryoablation, laser, chemical, and high-intensity focused ultrasound. As is readily apparent, such an ablation treatment requires precise positioning of the ablation catheter for optimal results.

Typically, ablation therapies have been delivered by making a number of individual ablations in a controlled fashion in order to form a lesion line. Such lesion lines are often desirable around/between the pulmonary veins in the left atrium of the heart which have been associated with the introduction of erratic electric impulses into the heart. There are devices in development or being commercialized that attempt to achieve a sufficient lesion line with minimal applications of energy. Existing designs range from diagnostic catheters with a hoop and balloon mounted designs with energy applying or extracting features. The existing designs often suffer from a lack of continuous contact around a circumference of the pulmonary vein during therapy delivery, resulting in inconsistent lesion lines and incomplete electrical impulse blockage.

The foregoing discussion is intended only to illustrate the present field and should not be taken as a disavowal of claim scope.

BRIEF SUMMARY

The instant disclosure relates to electrophysiology catheters for tissue ablation within a cardiac muscle. In particular, the instant disclosure relates to an electrophysiology catheter including an ablation balloon that receives a cryogenic fluid for administering an ablation therapy on a pulmonary vein, for example.

Aspects of the present disclosure are directed to an ablation catheter system that includes a catheter shaft with proximal and distal ends, a catheter handle coupled to a proximal end of the catheter shaft, a cryogenic ablation balloon coupled to the distal end of the catheter shaft with an internal cavity therein, an exhaust lumen in fluid communication with the internal cavity of the ablation balloon, and a pressure blow-off valve fluidly coupled in-line with the exhaust lumen. The ablation balloon deploys from an undeployed configuration, engages target tissue, and delivers a cryogenic ablation therapy to the target tissue. The exhaust lumen extends through a length of the catheter shaft to the catheter handle. The pressure blow-off valve releases excess pressure build-up within the exhaust lumen. In some more specific embodiments, the catheter system further includes capital equipment, a catheter connector coupled to a proximal end of the catheter handle, and a system connector coupled to the capital equipment. The system connector and catheter connector are coupled to one another and thereby facilitate communication of fluids therebetween.

Some aspects of the present disclosure are directed to a connector locking mechanism, on a first connector, including a connector lock release, a locking spring, and a connector locking feature. The locking spring exerts a spring force against the connector lock release, and the connector locking feature engages with a lock ring groove on a second mating connector while coupled. The connector lock release is mechanically coupled to the connector locking feature. The connector lock release receives an unlocking force that overcomes the spring force, transmits the unlocking force to the connector locking feature which disengages the connector locking feature from the lock ring grove, and thereby facilitates the decoupling of the first connector and a second connector. In some specific embodiments, the connector locking mechanism couples the first and second connectors to one another, maintains the coupling of the first and second connectors absent an unlocking force, and facilitates the communication of fluid therebetween.

Various aspects of the present disclosure are directed to a cryogenic ablation balloon catheter handle including an exhaust lumen that extends through a length of the catheter handle, a bellows positioned inline along the length of the exhaust lumen, an inner support structure that couples a catheter shaft to the handle, an adaptor hub that is coupled to a guidewire lumen of the catheter shaft, and a slide that is coupled to the adaptor hub. The slide freely slides along a longitudinal axis of the catheter handle, and adjusts a relative coaxial position of the guidewire lumen relative to the catheter shaft in response to inflation and/or deflation of the ablation balloon. In more specific embodiments, the ablation balloon catheter handle further includes a thermocouple positioned within the bellows. The thermocouple detects a change in temperature within the bellows associated with a phase change of cryogenic fluid within the bellows.

The foregoing and other aspects, features, details, utilities, and advantages of the present disclosure will be apparent from reading the following description and claims, and from reviewing the accompanying drawings.

BRIEF DESCRIPTION OF THE DRAWINGS

Various example embodiments may be more completely understood in consideration of the following detailed description in connection with the accompanying drawings.

Figure 1A:
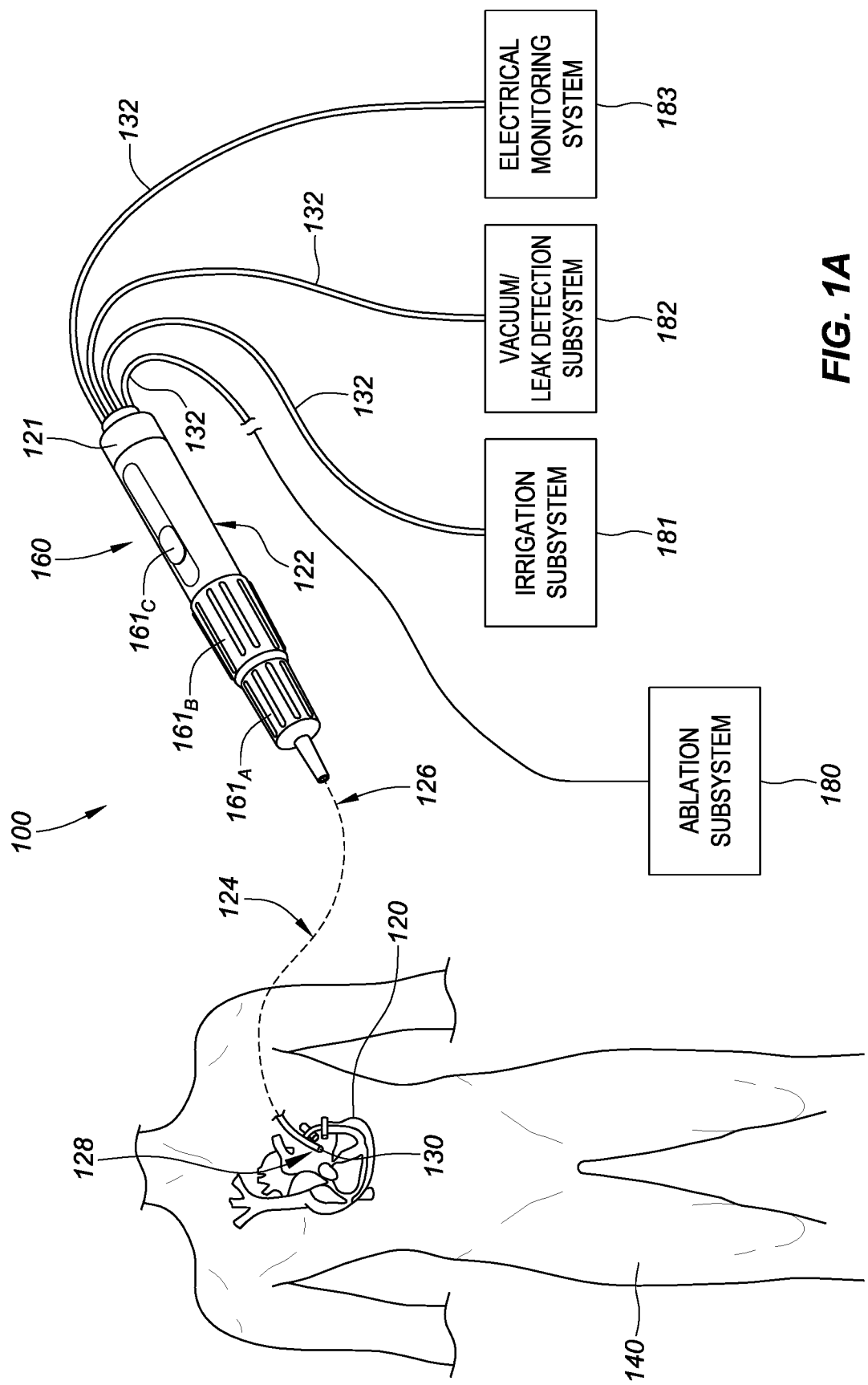
FIG. 1A is a schematic and diagrammatic view of a catheter system for performing a therapeutic medical procedure, consistent with various aspects of the present disclosure.

While various embodiments discussed herein are amenable to modifications and alternative forms, aspects thereof have been shown by way of example in the drawings and will be described in detail. It should be understood, however, that the intention is not to limit the scope to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION OF EMBODIMENTS

The instant disclosure relates to electrophysiology catheter systems for tissue ablation within a cardiac muscle. In particular, the instant disclosure relates to an electrophysiology catheter system including an ablation balloon that receives a cryogenic fluid for administering an ablation therapy on a pulmonary vein, for example.

Aspects of the present disclosure are directed to ablation therapies in which myocardial tissue in pulmonary veins, which form conductive pathways for electrical signals traveling through the tissue, is destroyed in order to electrically isolate sources of unwanted electrical impulses (e.g., arrhythmogenic foci) located in the pulmonary veins. By either destroying the arrhythmogenic foci, or electrically isolating them from the left atrium, the symptoms of the arrhythmia may be reduced or eliminated.

In an example embodiment of the present disclosure, an ablation balloon catheter may be introduced into the left atrium by a steerable catheter sheath (commonly referred to as an introducer). A catheter shaft may guide the ablation balloon once introduced into the left atrium by the sheath. Optionally, the ablation balloon catheter may include mapping electrodes at a distal end of the ablation balloon catheter. The mapping electrodes may be ring electrodes that allow the clinician to perform a pre-deployment electrical mapping of the conduction potentials of the pulmonary vein. Alternatively, mapping electrodes may be carried on-board a separate electrophysiology catheter, which may extend through a guidewire lumen that extends through a length of the catheter shaft. As the ablation balloon catheter contacts the pulmonary vein, mapping may be conducted using electrodes (within or adjacent to the ablation balloon) in order to verify proper location prior to deployment of the ablation balloon, as well as confirm diagnosis prior to conducting an ablation therapy.

Once a catheter sheath is in position within a patient's left atrium, a steerable ablation balloon catheter is advanced out a distal end of the sheath and toward one of four pulmonary veins. The steerable sheath of the ablation balloon catheter may be manipulated until the distal tip of the ablation balloon catheter is substantially aligned with a longitudinal axis of the target pulmonary vein; after which, the ablation balloon is expanded and extended into contact with the target pulmonary vein. A guidewire lumen may also be used to facilitate placement of the balloon. To ablate tissue surrounding an ostia of the target pulmonary vein, a manifold distributes a super-cooled liquid (e.g., a cryogenic fluid) within the balloon—the super-cooled liquid, through conduction, cools an inner surface of the balloon in contact with the targeted tissue of the pulmonary vein to ablate the tissue. Upon entering the balloon, the cryogenic fluid experiences a pressure drop resulting in a phase-change of the cryogenic liquid to a gas within the balloon—the phase change absorbs thermal energy within and in conductive proximity with the balloon to ablate the myocardial tissue of the target pulmonary vein.

In some specific embodiments, the distal end of the ablation balloon catheter may include electrodes for touch-up radio-frequency ablation, following a cryoablation treatment for example.

Details of the various embodiments of the present disclosure are described below with specific reference to the figures.

Referring now to the drawings wherein like reference numerals are used to identify similar components in the various views, FIG. 1A is a schematic and diagrammatic view of a catheter ablation system 100 for performing tissue ablation procedures. In one example embodiment, tissue 120 comprises cardiac tissue (e.g., myocardial tissue) within a human body 140. It should be understood, however, that the system may find application in connection with a variety of other tissue within human and non-human bodies, and therefore, the present disclosure is not meant to be limited to the use of the system in connection with only cardiac tissue and/or human bodies.

Catheter ablation system 100 may include a catheter 160 and an ablation subsystem 180 for controlling an ablation therapy conducted by an ablation balloon 130 at a distal end 128 of the catheter 160. The ablation subsystem 180 may control the generation and/or application of ablative energy including, in the present embodiment, cryoablation.

In the example embodiment of FIG. 1A, catheter 160 may conduct examination, diagnosis, and/or treatment of internal body tissue such as myocardial tissue 120. The catheter may include a cable connector or interface 121, a handle 122, a shaft 124 having a proximal end 126 and a distal end 128 (as used herein, "proximal" refers to a direction toward the end of the catheter 160 near the handle 122, and "distal" refers to a direction away from the handle 122), and an ablation balloon 130 coupled to the distal end 128 of the catheter shaft 124.

In one example application, ablation balloon 130 is manipulated through vasculature of a patient 140 using handle 122 to steer one or more portions of shaft 124 and position the ablation balloon at a desired location within tissue 120 (e.g., a cardiac muscle). In the embodiment of FIG. 1A, the ablation balloon includes one or more cryoablation manifolds that, when operated by ablation subsystem 180, ablates the tissue in contact with the ablation balloon (and in some cases tissue in proximity to the ablation balloon may be ablated by thermal transfer through the blood pool and proximal tissue).

In various specific embodiments of the present disclosure, catheter 160 may include electrophysiology electrodes and one or more positioning sensors (e.g., ring electrodes or magnetic sensors) at a distal end 128 of catheter shaft 124. In such an embodiment, the electrophysiology electrodes acquire electrophysiology data relating to cardiac tissue 120 in contact with the electrodes, while the positioning sensor(s) generate positioning data indicative of the 3-D position of the ablation balloon 130 within patient 140. In further embodiments, the catheter 160 may include other catheter components such as, for example and without limitation, steering wires and actuators, irrigation lumens and ports, pressure sensors, contact sensors, temperature sensors, additional electrodes, and corresponding conductors or leads.

Connector 121 provides mechanical and electrical connection(s) for one or more cables 132 extending, for example, from ablation subsystem 180 (through catheter handle 122 and shaft 124) to ablation balloon 130 mounted on a distal end 128 of the catheter shaft 124. The connector 121 may also provide mechanical, electrical, and/or fluid connections for cables 132 extending from other components in catheter system 100, such as, for example, irrigation subsystem 181 (when the catheter 160 is an irrigated catheter), vacuum/leak detection subsystem 182, and an electrical monitoring system 183. The vacuum/leak detection subsystem 182 may be used to both draw spent cryogenic gas from the ablation balloon 130, and to determine whether a leak has developed in an interstitial space between a dual layer balloon. The ablation subsystem 180 delivers pressurized cryogenic fluid through the connector 121 of the handle 122, with the handle 122 further routing the cryogenic fluid into a lumen that runs a length of the catheter shaft 124 and into the ablation balloon 130. The connector 121 and catheter handle 122 are discussed in more detail in reference to FIGS. 2A-3A below.

Handle 122 provides a location for a clinician to operate catheter 160, and may further provide steering or guidance for the shaft 124 within patient's body 140. For example, in the present embodiment, the handle includes two actuators $161_{A-B}$ which facilitate manipulation of a distal end 128 of the shaft to steer the shaft in two perpendicularly extending planes (e.g., bi-directional steering). The handle 122 also includes a slider $161_C$ which facilitates longitudinal manipulation of an inner shaft relative to an outer shaft (also referred to as a sheath or introducer, as discussed in more detail in reference to FIG. 1B). In other embodiments, control of the catheter may be automated by robotically driving or controlling the catheter shaft, or driving and controlling the catheter shaft using a magnetic-based guidance system. In some embodiments, the handle may include a single actuator which facilitates uni-directional manipulation of a distal end 128 of the shaft 124.

Catheter shaft 124 is an elongated, tubular, and flexible member configured for movement within a patient's body 140. The shaft supports an ablation balloon 130 at a distal end 128 of catheter 160. The shaft facilitates the transport, delivery and/or removal of fluids (including irrigation fluids, cryogenic fluids, and body fluids), medicines, and/or surgical tools or instruments. The shaft, which may be made from conventional materials used for catheters, such as polyurethane, defines one or more lumens configured to house and/or transport electrical conductors, fluids, and/or surgical tools. The catheter may be introduced into a blood vessel or other structure within the body through a conventional introducer sheath.

In one example application of a cryogenic ablation balloon catheter, consistent with the present disclosure, a cardiac ablation therapy to correct for an atrial arrhythmia may be conducted. The introducer sheath is introduced through a peripheral vein (typically a femoral vein) and advanced into the right atrium. In what is referred to as a transseptal approach, the introducer sheath then makes an incision in the fossa ovalis (the tissue wall between the left and right atriums), extends through the incision in the fossa ovalis, and may be anchored thereto. The ablation catheter may then be extended through a lumen of the introducer sheath into the left atrium. Catheter shaft 124 of ablation catheter 160 may then be steered, or otherwise guided (e.g., via guidewire which extends through a guidewire lumen extending a length of the catheter shaft 124), through the left atrium to position an ablation balloon 130 into a desired location within the left atrium (e.g., a pulmonary vein).

During cardiac ablation therapy, it is desirable to align the longitudinal axis of ablation balloon 130 with a centerline of a target pulmonary vein at which the ablation therapy is to take place.

Various embodiments of the present disclosure are directed to ablation therapy of one or more pulmonary veins via cryoablation. To achieve the desired cooling within the ablation balloon 130, cryogenic fluid (also referred to as cryofluid, cryo, or cryogen) delivered to the balloon, in response to a rapid pressure change between the manifold and the balloon, undergoes a phase change from a liquid to a gas. The phase change of the cryofluid requires a large amount of energy which has a cooling effect on tissue in proximity to the phase change. As the cryofluid expands to its gaseous state, the pressure within the balloon increases. Aspects of the present disclosure are directed to controlling the pressure within the ablation balloon 130. In some embodiments, actions may be taken to quickly alleviate pressure within the balloon; for example, dumping the head pressure and/or exhaust pressure.

Once an ablation therapy is complete, an exhaust lumen may be coupled to a vacuum to draw out any remaining fluid within the ablation balloon, thereby collapsing the ablation balloon. The ablation balloon, in its collapsed state, and catheter shaft may then be retracted back into a steerable (introducer) sheath.

Various aspects of the present disclosure are directed to a catheter handle 122 that facilitates the transfer of fluids between a balloon 130 at a distal tip 128 of the catheter shaft 124 and capital equipment also coupled to the handle via connector 121. Such capital equipment includes an ablation subsystem 180, irrigation subsystem 181, a vacuum/leak detection subsystem 182, among others. The handle 122 includes structures that facilitate the connection of lumens extending through the catheter shaft 124 to lumens that are coupled to the capital equipment (e.g., ablation subsystem 180, irrigation subsystem 181, vacuum/leak detection subsystem 182, etc.).

Figure 1B:
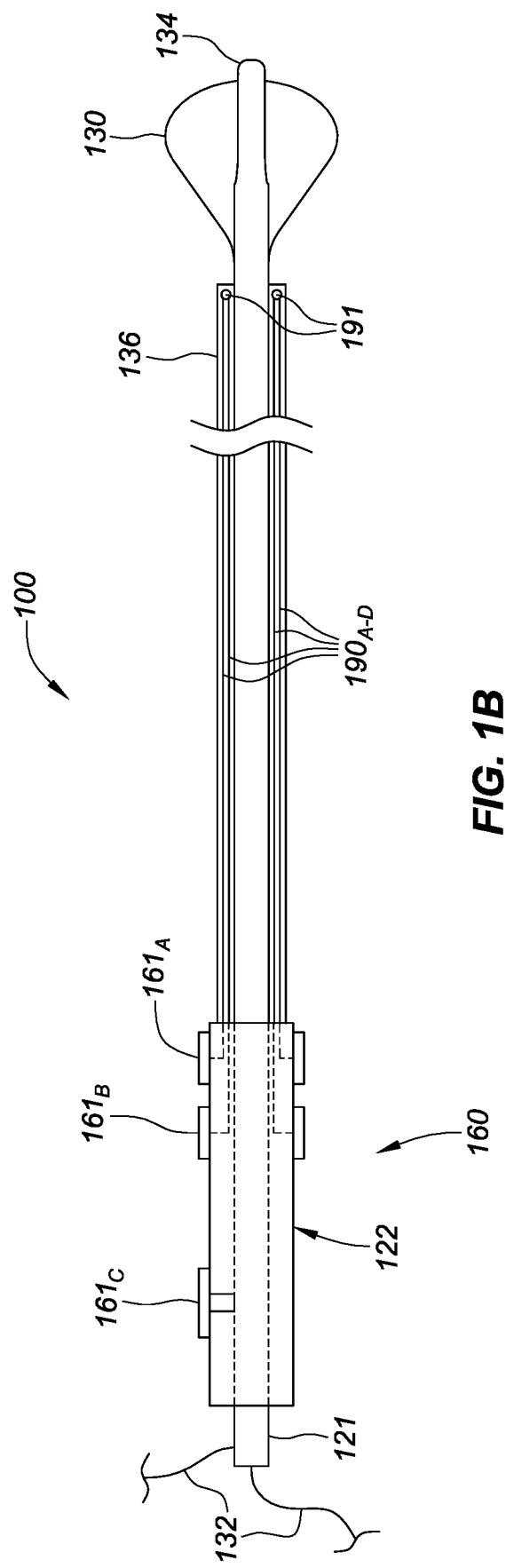
FIG. 1B is a cross-sectional side view of one implementation of the catheter system shown in FIG. 1A, consistent with various aspects of the present disclosure.

FIG. 1B is a cross-sectional side view of one implementation of an ablation catheter 160 of catheter system 100 shown in FIG. 1A. In the present embodiment, a distal end of the ablation catheter 160 includes a balloon 130 that may be delivered and inflated near a target portion of a patient's body via the cardio-vasculature system. The balloon 130 may be stored during delivery within an interstitial space between inner shaft 134 and delivery sheath 136 (also referred to as a steerable catheter sheath, or introducer). Pull wires 190$_{A-D}$, extending a length of the sheath 136, and coupled to one or more pull rings 191 near a distal end of the ablation catheter 160 facilitate positioning of the distal portion of the catheter in proximity to the target. A handle 122 of ablation catheter 160 may include rotary actuators 161$_{A-B}$ which facilitate manipulation of the pull wires 190$_{A-D}$, and thereby steer a distal end of the sheath 136. To facilitate deployment of the ablation balloon 130, a clinician, upon arriving at the target location, may manipulate linear actuator 161$_c$ to extend a distal end of inner shaft 134 out of sheath 136 (as shown in FIG. 1B).

Once the ablation balloon 130, coupled to inner shaft 134, has extended out of the sheath 136, the balloon may be inflated and extended into contact with tissue targeted for ablation (e.g., an ostium of a pulmonary vein).

A proximal end of ablation catheter 160 may include a cable connector or interface 121 coupled to handle 122 which facilitates coupling the ablation catheter 160 to other elements of the catheter system 100 (e.g., irrigation subsystem 181, vacuum/leak detection subsystem 182, and electrical monitoring system 183, as shown in FIG. 1A) via cables 132.

Figure 1C:
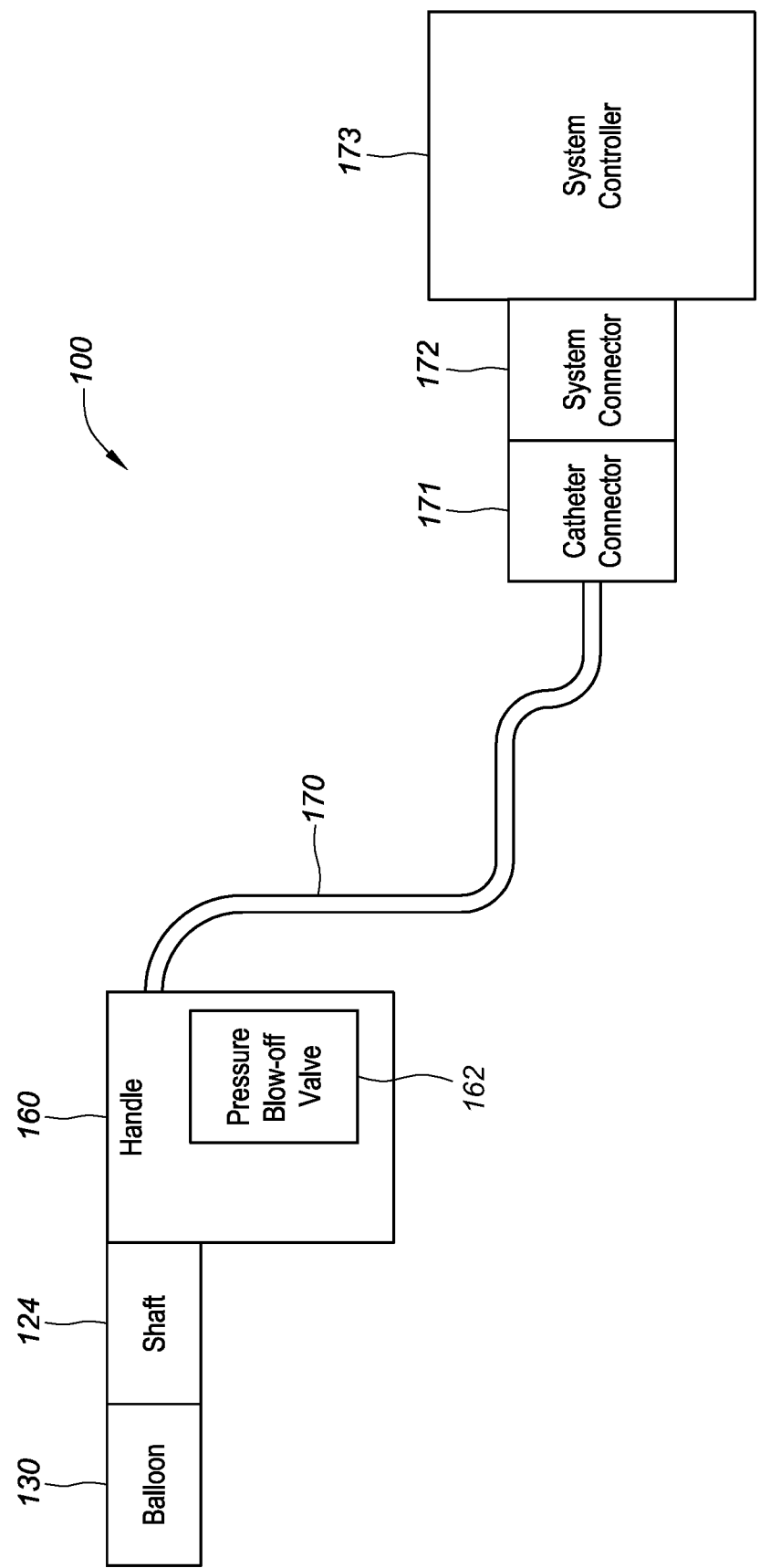
FIG. 1C is a diagrammatic view of a catheter system, consistent with various aspects of the present disclosure.

FIG. 1C is a diagrammatic view of an ablation catheter system 100, consistent with various aspects of the present disclosure. In embodiments of the present disclosure consistent with FIG. 1C, an ablation catheter system 100 delivers cryogenic fluid between a system controller 173 (also referred to as an ablation subsystem or capital equipment) and a balloon 130 at a distal end of a catheter shaft 124. Specifically, pressurized cryogenic fluid in a liquid state (and often supercooled) is delivered from a pressurized tank within the system controller 173 through a connector junction (comprising a catheter connector 171 and a system connector 172), an extension cable 170 between the system controller 173 and a handle 160 of the catheter, and finally through a length of the catheter shaft 124 to the balloon via one or more lumens. As discussed in more detail above, upon entering the balloon 130, the liquid cryogen experiences a rapid depressurization that causes a phase change of the cryogen to a gaseous state—absorbing energy and thereby ablating tissue (over time) in contact with an exterior of the balloon via conductive heat transfer.

The gaseous state of the cryogen is much less dense and therefore balloon 130 pressurizes and causes a flow of the gaseous cryogen out of the balloon via an exhaust lumen. The exhaust lumen receives the cryogenic exhaust at a proximal end of the balloon 130, the exhaust flowing from the balloon 130 to the catheter shaft 124. In many embodiments, the exhaust lumen runs in parallel with the cryogenic fluid lumen. Upon arriving at the handle 160, the flow of exhaust is run through a pressure blow-off valve 162. Where the pressure within the exhaust lumen, and thereby the pressure in the balloon, exceeds safe operating limits (e.g., greater than 30 pounds per square inch ("PSI"), or greater than 35 PSI) the pressure blow-off valve 162 reduces the pressure therein by releasing some of the exhaust into the surrounding atmospheric environment to mitigate the likelihood of a balloon rupture. Where the pressure in the balloon is within safe operating limits, the exhaust from the balloon continues through extension cable 170 and back to the system controller 173 where the exhaust may be scavenged and re-pressurized for later use, or released into the surrounding atmospheric environment. In yet other embodiments, the exhaust may be placed into a reservoir and disposed of at a later date.

In various embodiments of the present disclosure including an ablation balloon 130 with dual layers (also referred to as inner and outer balloons), safety features may be implemented to prevent rupture of both the inner and outer balloons which could potentially cause the distribution of cryogenic fluid (e.g., Nitrous-oxide) throughout the patient's cardiovascular system. In such embodiments, an interstitial space between the inner and outer balloons may be fluidly coupled to one or more lumens which facilitate drawing a vacuum within the interstitial space and monitoring the interstitial space for pressure changes. For example, where the inner balloon ruptures, the vacuum would be reduced as cryogenic fluid entered into the interstitial space and a pressure sensor would sense the change in pressure therein. Where the pressure sensor is communicatively coupled to the system controller 173, the system controller may discontinue the ablation therapy and take other corrective actions to relieve the damaged balloon 130 of any residual pressure. Moreover, the vacuum applied to the interstitial space, via the vacuum lumen, will draw cryogen out of the ruptured, inner balloon—further reducing residual pressure within the inner balloon.

Figure 2:
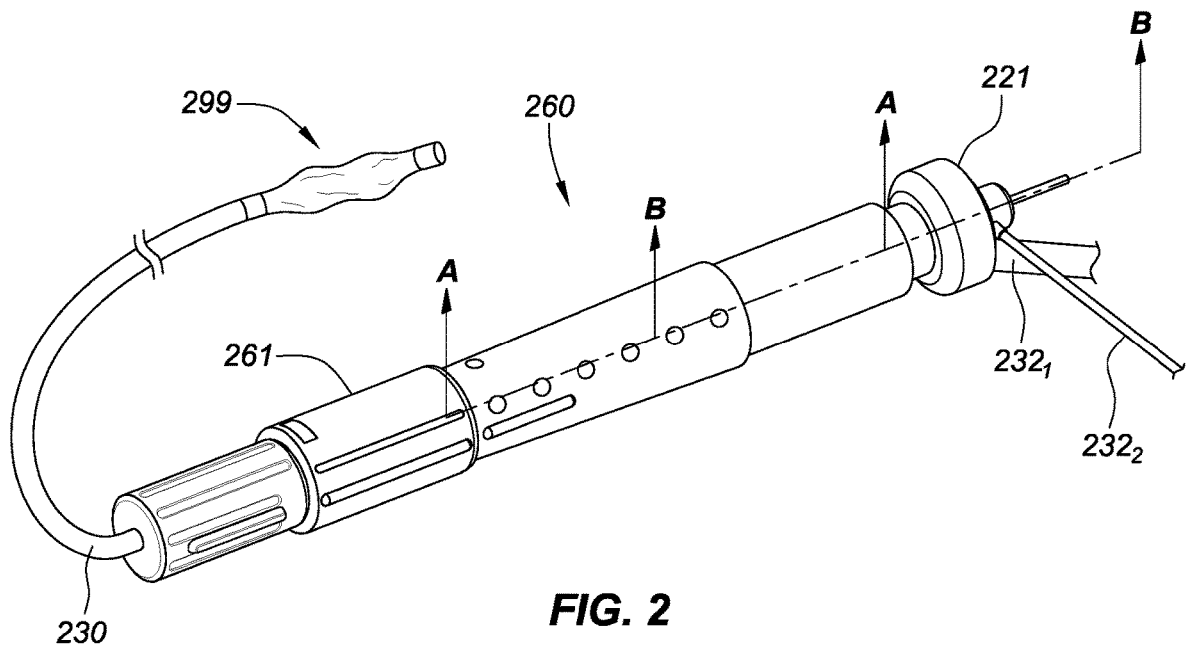
FIG. 2 is an isometric side view of a catheter system including a catheter handle, consistent with various aspects of the present disclosure.
Figure 2A:
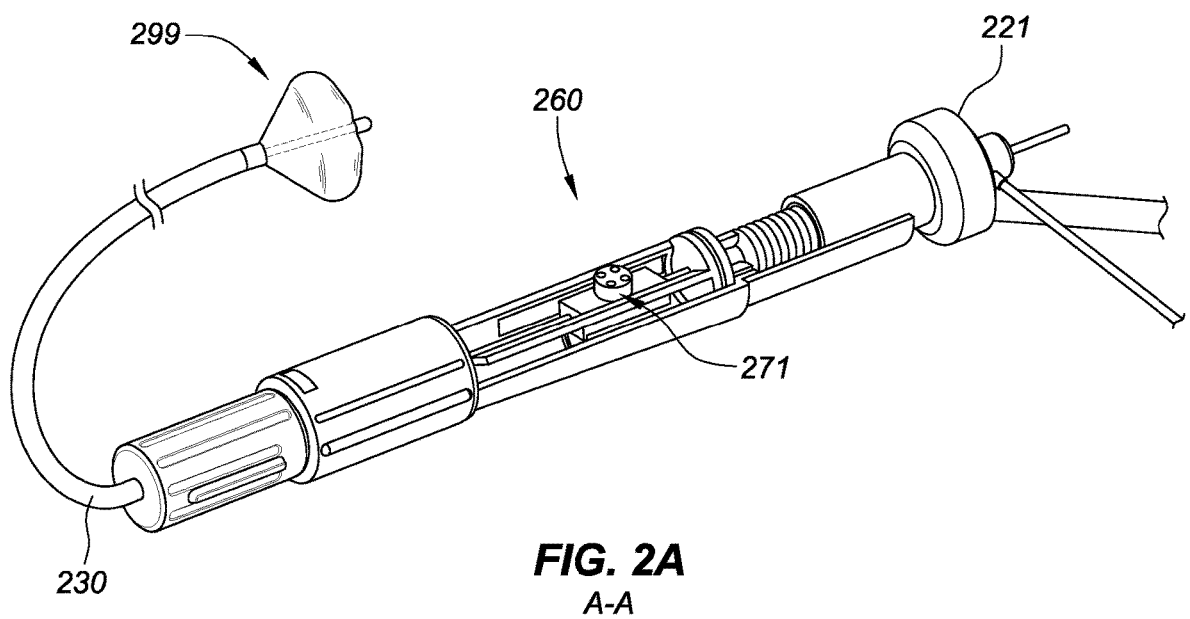
FIG. 2A is partial cross-sectional side view of a middle portion of the catheter handle of FIG. 2, consistent with various aspects of the present disclosure.
Figure 2B:
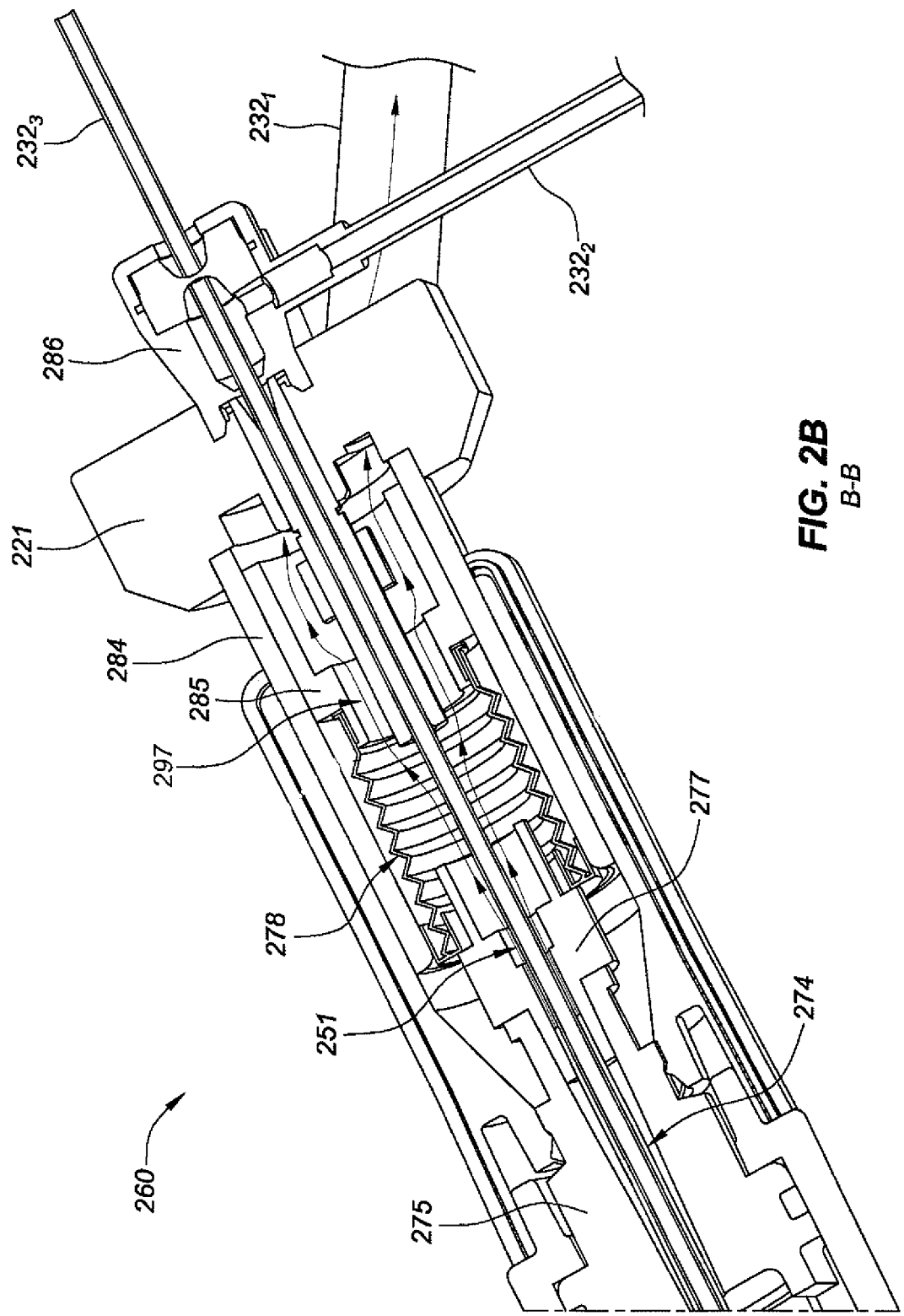
FIG. 2B is a cross-sectional side view of a proximal portion of the catheter handle of FIG. 2, consistent with various aspects of the present disclosure.

As discussed in reference to FIGS. 2-2B, handle 160 facilitates the connection of lumens (e.g., cryogenic fluid lumen(s), exhaust lumen(s), and vacuum lumen(s)) within the catheter shaft 124 with lumens within extension cable 170. Similarly, catheter connector 171 and system connector 172 facilitate the connection of lumens within the catheter shaft 124 and those within system controller 173 (as discussed in reference to FIGS. 4-6B).

FIG. 2 is an isometric side view of a catheter handle 260 of a catheter system, and FIG. 2A is partial cross-sectional, side view of the catheter handle 260 of FIG. 2, consistent with various aspects of the present disclosure. The catheter handle 260 includes an actuator 261 that facilitates deflection of a distal portion of catheter shaft 230, attached thereto, in at least one direction via steering wires that extend through a length of the catheter shaft to a pull ring assembly near a distal end of the catheter shaft. In the present embodiment, a guidewire or loop catheter (as shown in FIG. 2B-$232_3$) extends through a length of the catheter handle 260, catheter shaft 230, and ablation balloon 299. A flush/contrast lumen $232_2$ is fluidly coupled with an annulus that extends distally around the guidewire or loop catheter and facilitates the flow of irrigant (also referred to as flush) and/or contrast through to the distal tip of the ablation balloon. Irrigant may be pumped through the guidewire lumen during operation to prevent the egress of blood back through the guidewire lumen and into the catheter handle 260. When a clinician is attempting to completely occlude a pulmonary vein with the ablation balloon, for example, contrast may be pumped through the contrast lumen $232_2$ and up through the guidewire lumen and into the pulmonary vein. While imaging with fluoroscopy, stagnation of the contrast (which is visible in the fluoroscopic image) is indicative of (complete) occlusion of the target pulmonary vein with the ablation balloon.

Cryogen, exhaust, and vacuum lumens that arrive at the handle 260 via catheter shaft 230 may be routed through extension cable $232_1$ and delivered to one or more pieces of capital equipment. An adaptor hub 221 facilitates the connection of lumens from within the handle to mating lumens within the extension cable. The adaptor hub 221 is discussed in more detail in reference to FIG. 2B.

FIG. 2 further shows an ablation balloon 299 at a distal end of catheter shaft 230. The ablation balloon 299 is shown in an uninflated state for delivery of the catheter through an introducer sheath. In the uninflated state, the ablation balloon 299 is longer which requires a change in relative co-axial position between the catheter shaft 230 and a guidewire lumen therein.

The catheter handle 260 includes a pressure blow-off valve 271 that facilitates a pressure drop within an exhaust lumen (and the ablation balloon in fluid communication therewith) in response to an over-pressurization event. The pressure blow-off valve 271 is discussed in more detail in reference to FIGS. 3-3A below. In some embodiments, the pressure blow-off valve may be utilized in response to a kink in the exhaust lumen as it extends through extension cable $232_1$. The blow-off valve 271, though positioned within the catheter handle 260, may vent gas to the surrounding environment via openings in the catheter handle.

FIG. 2A further shows an ablation balloon 299 in an inflated state for conducting an ablation therapy on target myocardial tissue, for example. In the inflated state, the ablation balloon 299 is shorter in length than the uninflated state, which requires a change in relative, co-axial position between the catheter shaft 230 and a guidewire lumen therein. As a result, a catheter handle 260 must facilitate the resulting motion between the catheter shaft 230 and the guidewire lumen, which is accomplished via a bellows 278 in the handle (as shown in FIG. 2B). A volume of the bellows adjusts to facilitate the relative change in position between the catheter shaft 230 and the guidewire lumen.

FIG. 2B is a cross-sectional side view of a proximal portion of catheter handle 260 of FIG. 2. A proximal portion 274 of a catheter shaft extends through an inner support structure 275. The inner support structure 275 captures the proximal portion 274 of the catheter shaft. A guidewire lumen $232_3$ extends through a length of the catheter shaft and out a proximal portion of the handle 260. The guidewire lumen facilitates routing a guidewire, electrophysiology loop catheter, or other catheter through a length of the catheter shaft and out through an aperture at a distal end of the ablation balloon. A bellows seal 277 seals around the proximal portion 274 of the catheter shaft—thereby preventing the exhaust flow 251 from escaping out of the bellows between the catheter shaft and the inner support structure 275. The exhaust flow 251 emanating from the ablation balloon may then extend out of an exhaust lumen at the proximal portion of the catheter shaft and into bellows 278. From the bellows 278, the exhaust flow 251 extends into an annulus 297 within adaptor 285, through an adaptor hub 221 and into extension cable $232_1$. The hemo hub 286 seals a back-side of the bellows 278 and prevents exhaust from escaping via an annular space around the guidewire lumen $232_3$.

In some embodiments, hemo hub 286 may include a secondary seal which prevents the back-flow of high-pressure contrast through a proximal end of guidewire lumen $232_3$.

A slide 284 within the catheter handle 260 facilitates longitudinal movement of the adaptor 285 and thereby guidewire lumen $232_3$ (coupled thereto). The longitudinal movement may be in response to, for example, inflation/deflation of the ablation balloon which changes the overall length of the catheter shaft 230 and balloon relative to the guidewire lumen (which are coupled to one another at a distal end of the catheter shaft). Accordingly, the slide 284 prevents the placement of a strain on either the guidewire lumen and/or catheter shaft in response to longitudinal movement of the catheter shaft and guidewire lumen relative to one another.

In various embodiments of the present disclosure, vacuum and cryogenic fluid lumens may be routed through a larger exhaust lumen within catheter shaft 230. In such an embodiment, the vacuum and cryogenic fluid lumens may follow a similar path through the catheter handle 260 via the exhaust flow 251 and into extension cable $232_1$.

In some specific/experimental embodiments, bellows 278 may have a thermocouple mounted therein. The thermocouple may measure a temperature of cryogen exhaust traveling through the bellows 278. The thermocouple may be communicatively coupled with controller circuitry for the catheter system and temperature data from the thermocouple may be used to facilitate safety features of the catheter system. For example, where the cryogenic liquid is not undergoing a phase change into a gas within the ablation balloon, the increased volume and thereby the decreased pressure within the bellows 278 may facilitate some phase-change of the cryogen causing cooling within the handle 260. Where the controller circuitry detects a signal from the bellow's thermocouple indicative of a cooling within the bellows 278, the controller circuitry may discontinue the ablation therapy and reset the system by purging the catheter of cryogen.

Where the thermocouple within the bellows 278 does not sense a substantial temperature drop during the ablation therapy, controller circuitry can conclude that the cryogenic fluid within the ablation balloon is substantially converting into a gas, as desired for ablation of tissue in contact therewith.

Figure 3:
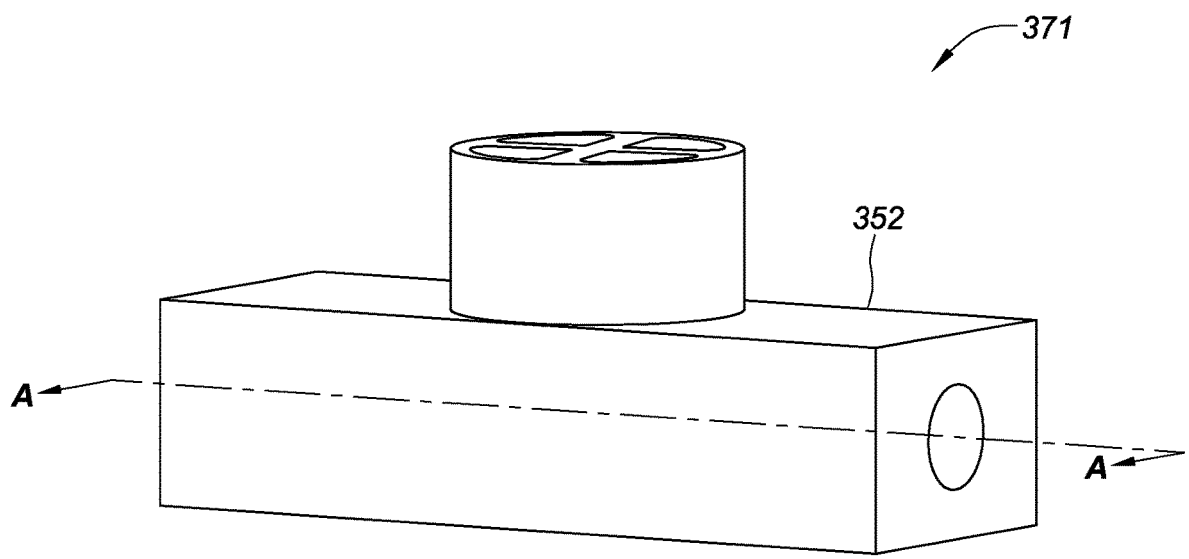
FIG. 3 is an isometric side view of a pressure blow-off valve, consistent with various aspects of the present disclosure.
Figure 3A:
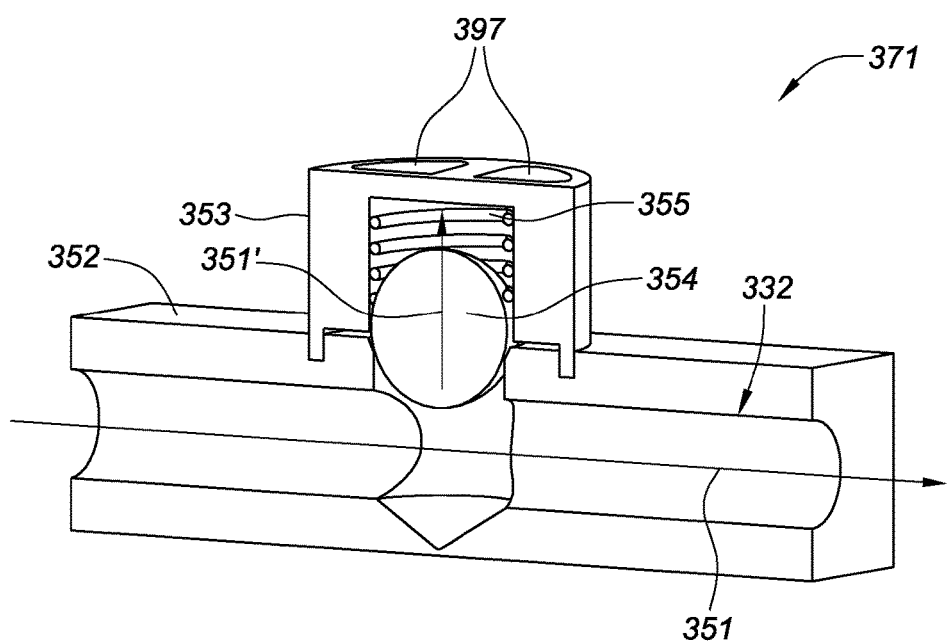
FIG. 3A is a cross-sectional, isometric side view of the pressure blow-off valve of FIG. 3, consistent with various aspects of the present disclosure.

FIG. 3 is an isometric side view of a pressure blow-off valve 371, and FIG. 3A is a cross-sectional, isometric side view of the pressure blow-off valve 371 of FIG. 3, consistent with various aspects of the present disclosure. The pressure blow-off valve 371 includes a valve body 352 through which an exhaust flow 351 flows through via an exhaust lumen 332. When the exhaust flow 351 pressure within the exhaust lumen 332 exceeds a design pressure of the pressure blow-off valve, a valve seal spring 355 is overcome by the pressure exerted on valve ball seal 354 allowing the valve ball seal 354 to release overpressure exhaust flow 351' through vents 397 as the valve seal spring 355 deforms. Once the pressure blow-off valve 371 has released the excess pressure, the valve seal spring 355 overcomes the pressure exerted on valve ball seal 354 to re-seal exhaust lumen 332 and to cease the overpressure exhaust flow 351' from the exhaust flow 351.

Figure 4:
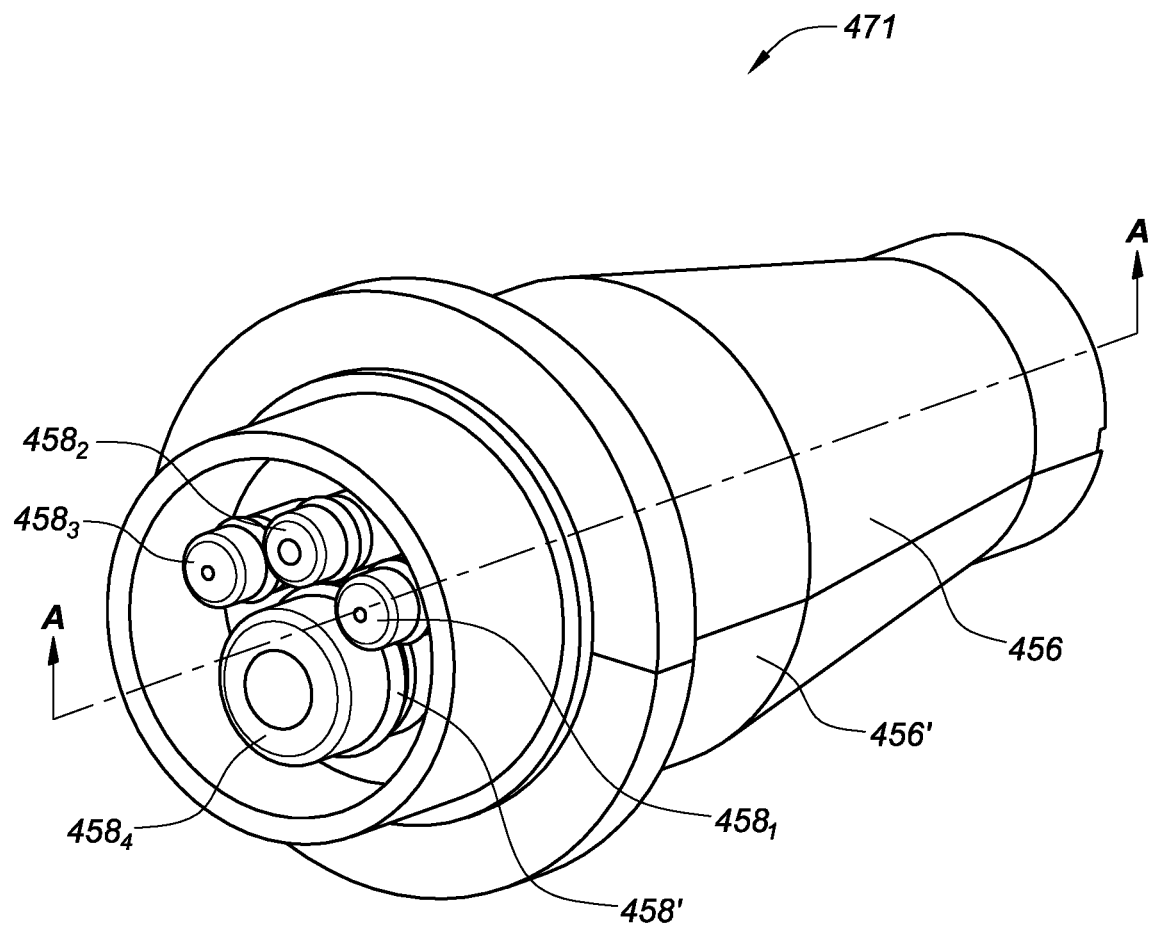
FIG. 4 is an isometric side view of a catheter connector assembly, consistent with various aspects of the present disclosure.

FIG. 4 is an isometric side view of a catheter connector assembly 471. The catheter connector assembly 471 facilitates coupling a catheter assembly to capital equipment. A proximal end of catheter connector assembly 471 includes connectors $458_{1-4}$. The connectors facilitate fluidly coupling individual lumens on either side of the connectors. In the present embodiment, four lumens extend through a length of the catheter and are coupled to the connectors $458_{1-4}$. A vacuum lumen extends into communication with an interstitial space between two layers of the ablation balloon, and is communicatively coupled with a vacuum source within capital equipment on an opposite side of catheter connector 471 via vacuum connector $458_1$. To monitor a vacuum pressure within the interstitial space of the balloon, a pressure sensor lumen communicatively coupled with the interstitial space extends a length of the catheter shaft to a pressure sensor that is located within the capital equipment via pressure sensor connector $458_3$.

A cryogenic fluid lumen delivers cryogen stored within the capital equipment through the catheter connector 471 via cryogenic fluid connector $458_2$ and through a second cryogenic fluid lumen that extends a length of a catheter shaft where the cryogenic fluid is dispensed into a chamber defined by a first layer of the balloon. Once the cryogenic fluid has been converted into a gas within the chamber, the cryogenic fluid is exhausted via an exhaust lumen that extends through a length of the catheter shaft to a scavenger system, exhaust reservoir, or atmospheric release within the capital equipment via exhaust connector $458_4$. To facilitate a hermetic seal at the connectors 458, each of the connectors 458 include a seal 458' (e.g., o-ring, or other gasket) between the male connectors of the catheter connector 471 and the female connectors of the capital equipment connector.

Figure 4A:
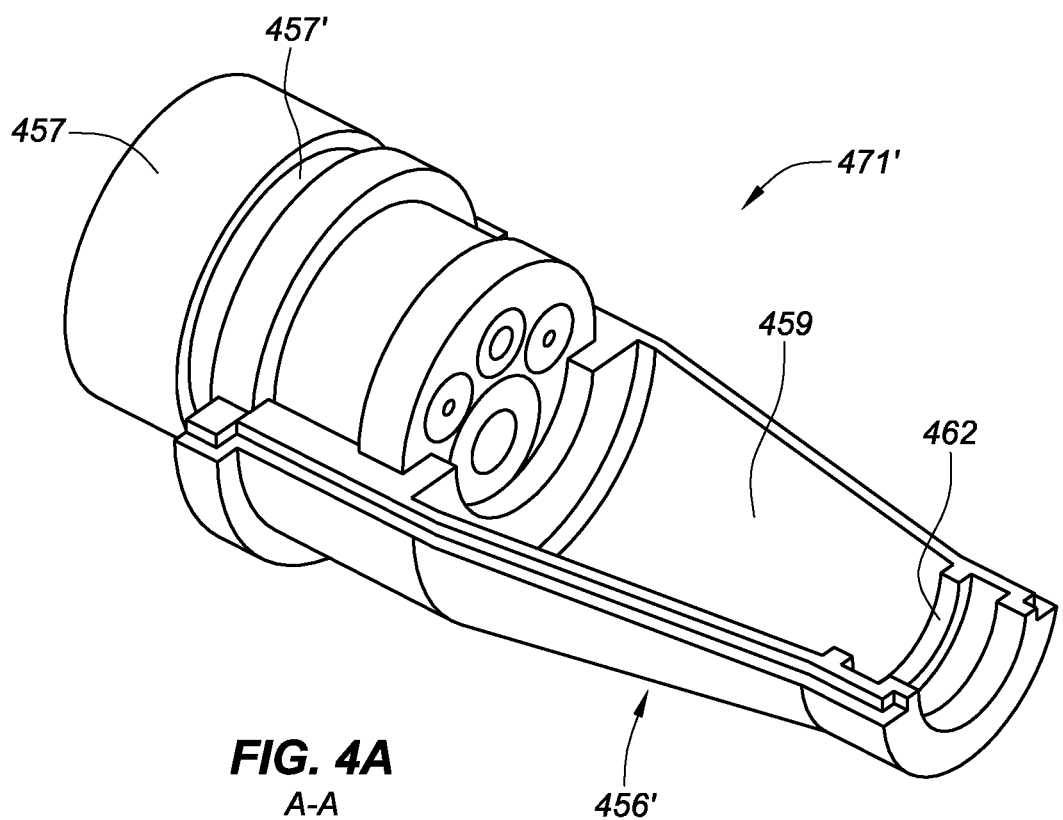
FIG. 4A is an isometric side view of the partially assembled catheter connector assembly of FIG. 4, consistent with various aspects of the present disclosure.

The catheter connector assembly 471 may comprise an upper connector shell 456 and lower connector shell 456' which may be coupled together using conventional methods. As shown in FIG. 4A, which is an isometric side view of a partially assembly catheter connector assembly 471' of FIG. 4, a connector housing 457 integrates each of the connectors $458_{1-4}$, and is assembled between the upper and lower connector shells. The connector housing 457 includes a lock ring groove 457' that extends circumferentially along an outer diameter of the housing. The lock ring groove 457', when the catheter connector assembly 471 is paired with a system connector assembly (see, e.g., FIG. 5), receives a connector locking feature 666', as shown in FIG. 6B, that locks the catheter and system connectors to one another until a user engages a release on the system connector. A distal end of catheter connector 471' is coupled to an extension cable at extension cable bond point 462. An exhaust travels through an inner diameter of the extension cable and into exhaust chamber 459 and through exhaust connector $458_4$ (as shown in FIG. 4). Lumens, for communicatively coupling cryogenic fluid, a vacuum source, and a pressure sensor to an ablation balloon, may extend through the inner diameter of the extension cable, through the exhaust chamber 459 and be coupled to their respective connectors $458_{1-3}$.

Figure 4B:
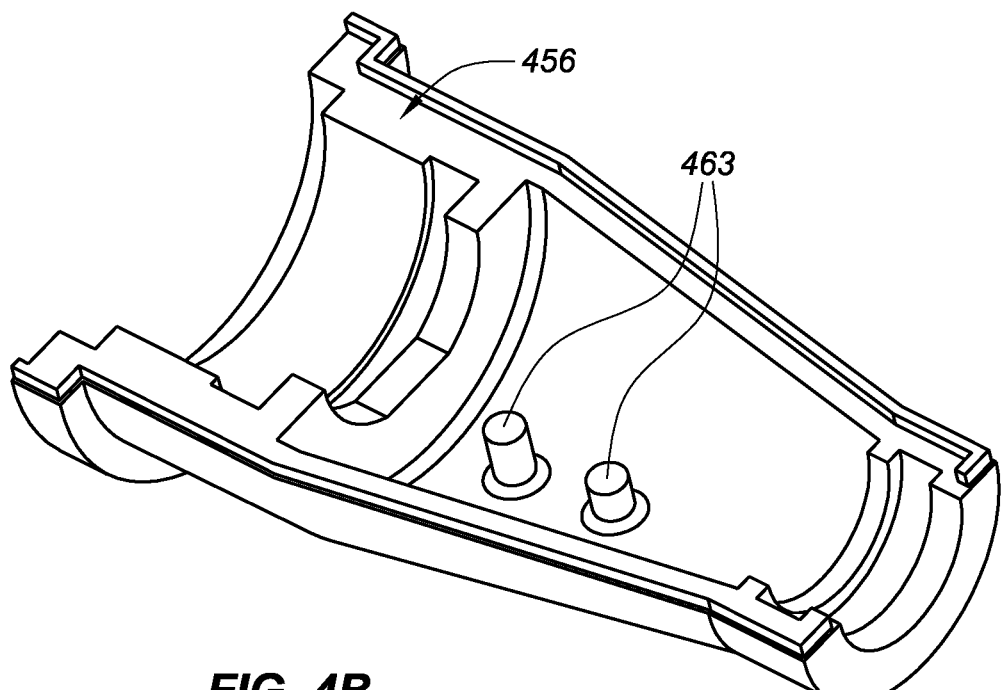
FIG. 4B is an isometric side view of an upper connector shell of the catheter connector assembly of FIG. 4, consistent with various aspects of the present disclosure.

FIG. 4B is an isometric side view of an upper connector shell 456 of the catheter connector of FIG. 4, showing locking members 463 which further facilitate bonding an extension cable to a distal end of catheter connector 471. In some specific embodiments, Kevlar fibers are wound into a length of the extension cable. A length of the Kevlar fibers may extend past a proximal end of the extension cable and be coupled to the one or more locking members 463, preventing the extension cable from separating from the catheter connector 471 in response to a tension applied thereto.

Figure 5:
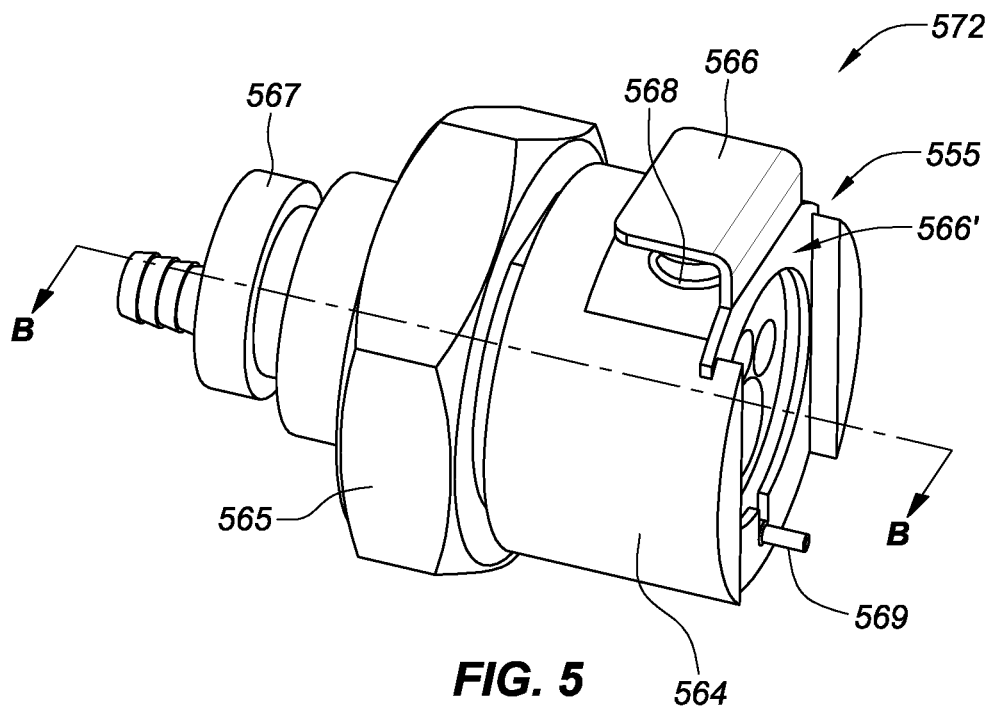
FIG. 5 is an isometric side view of a system connector, consistent with various aspects of the present disclosure.
Figure 5A:
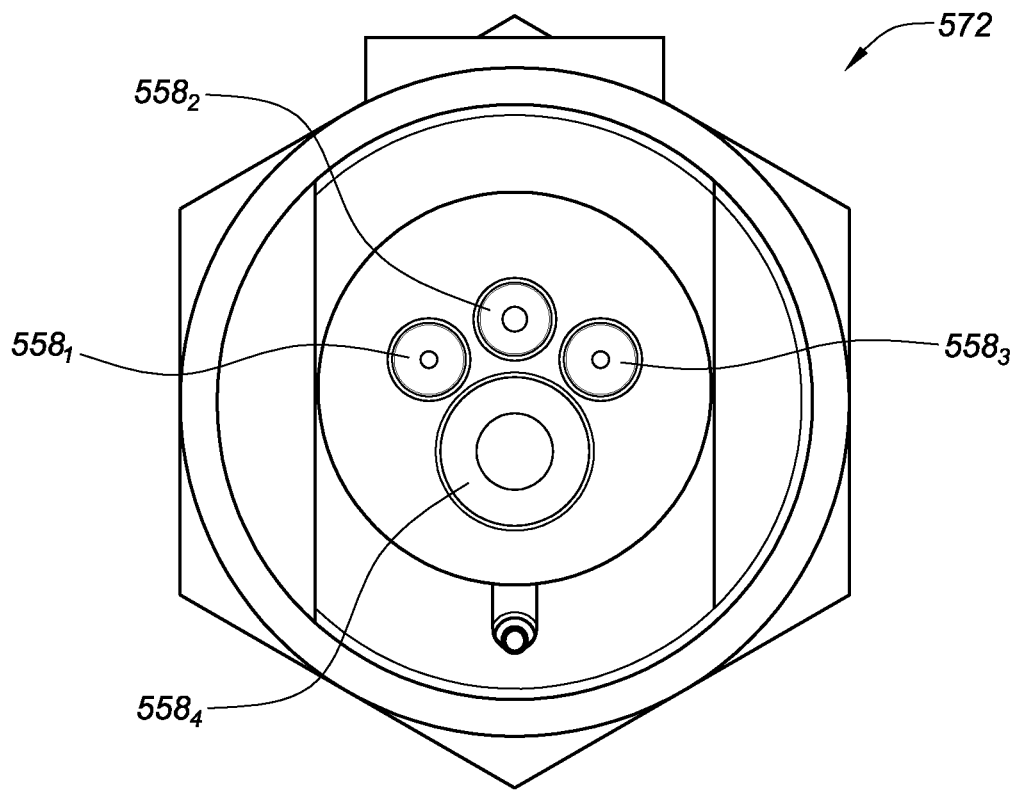
FIG. 5A is a front view of the system connector of FIG. 5, consistent with various aspects of the present disclosure.
Figure 5B:
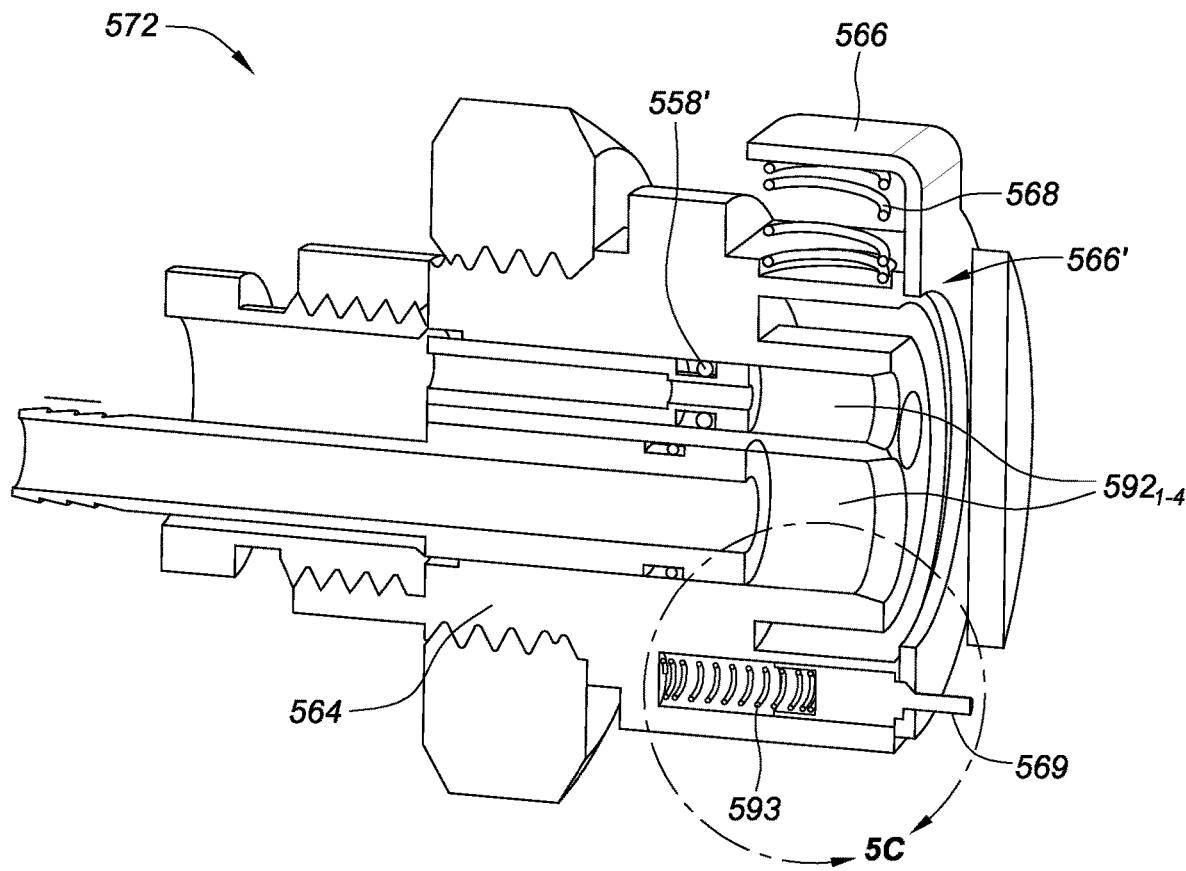
FIG. 5B is a cross-sectional side view of the system connector of FIG. 5, consistent with various aspects of the present disclosure.
Figure 5C:
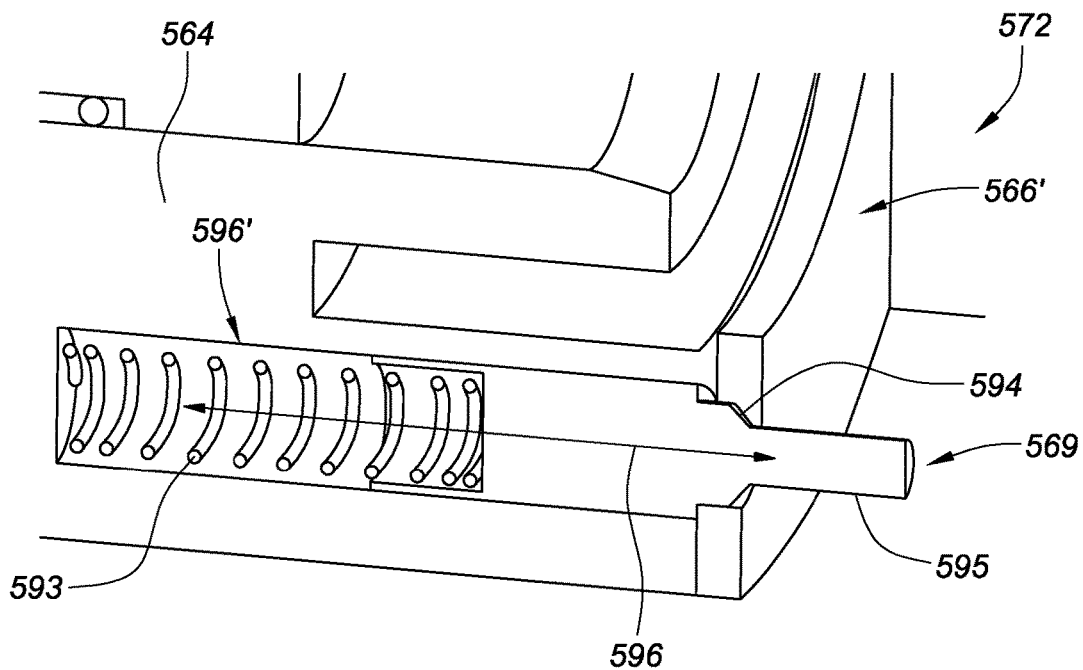
FIG. 5C is a close-up, cross-sectional side view of the system connector of FIG. 5, consistent with various aspects of the present disclosure.

FIG. 5 is an isometric side view of a system connector 572 (also referred to as a capital equipment connector), FIG. 5A is a front view of the system connector of FIG. 5, FIG. 5B is a cross-sectional side view of the system connector of FIG. 5, and FIG. 5C is a close-up, cross-sectional side view of the system connector of FIG. 5, consistent with various aspects of the present disclosure. A connector body 564 of the system connector 572 may be extended through an aperture in a piece of capital equipment, and coupled thereto via lock nut 565. A lumen retainer 567 may be used to fluidly couple one or more lumens to the system connector 572, which are then fluidly coupled to, for example, a vacuum source, a cryogenic fluid tank, and an exhaust release (or cryogenic fluid scavenger system).

The system connector 572 includes female connector ports $558_{1-4}$ which interface with male connector ports $458_{1-4}$ on a catheter connector 471 (as shown in FIG. 4). The female connector ports $558_{1-4}$ may include, for example, a vacuum connector $558_1$, a cryofluid connector $558_2$, a pressure sensor connector $558_3$, and an exhaust connector $558_4$.

To prevent unintentional disconnection between a system connector 572 and catheter connector 471 during an ablation therapy, for example, the system connector 572 includes a locking mechanism 555. The locking mechanism includes a connector lock release 566, a locking spring 568, a connector locking feature 566', and a locking pin 569. The locking spring 568 maintains the locking mechanism 555 in a normally locked configuration; in such a configuration, the locking mechanism 555, in response to a catheter connector interfacing with the system connector 572, actuates the locking pin 569 which allows the connector locking feature 566' to extend upward due to the force exerted thereon by the locking spring 568. When vertically extended, the connector locking feature 566' engages with lock ring groove 457' (as shown in FIG. 4A) to maintain a coupling between the catheter connector 471 and system connector 572. After a clinical operation using the ablation catheter is completed, the disposable ablation catheter may be disconnected from the capital equipment by depressing connector lock release 566, which overcomes the locking spring 568 force, and extends the connector locking feature 566' downward—disengaging the connector locking feature from the lock ring groove 457' of catheter connector 471 (which is discussed in more detail in reference to FIGS. 6-6B).

The locking pin 569 has a pin travel 596 that extends through a bore 596' within connector body 564. Absent contact with a catheter connecter, the locking pin 569 is fully extended within bore 596' (in response to the force exerted thereon by pin spring 593)—thereby limiting the vertical travel of connector locking feature 566' into a locked configuration. When a catheter connector is moved into proximity with the system connector 572, the distal tip of locking pin 569 contacts a surface of catheter connector—overcoming a force exerted on the pin by pin spring 593, driving the pin 569 further into bore 596'. When the pin is retracted into the bore, an un-locked stop surface 594 loses contact with the connector locking feature 566', facilitating movement of the connector locking feature 566' upwards in response to the force exerted by locking spring 568. The locking spring 568 extends the connector locking feature 566' vertically until it reaches a hard stop against lock stop surface 595 of locking pin 569. Upon depressing the connector lock release 566, a user may unlock the catheter and system connectors relative to one another, and as the catheter connector extends away from the system connector the locking pin 569 loses contact with the catheter connector allowing the pin spring 593 to extend the pin outward (relative to the bore 596') along pin travel 596. Once the pin is fully extended, the un-locked stop surface 594 will contact the connector locking feature 566' allowing for the clearance necessary to insert/retract a catheter connector.

During assembly of a catheter connector and system connector 572, male connectors of the catheter connector extend into connector bores $592_{1-4}$ within the system connector 572. Female connectors $558_{1-4}$ include seals 558' that prevent leakage of fluid within the bores $592_{1-4}$. Similarly, as discussed in reference to FIG. 4, the male connectors $458_{1-4}$ of catheter connector 471 also include seals 458' around an outer diameter which when inserted within the connector bores $592_{1-4}$ of system connector 572 further seals the connector ends to each connectors respective counterpart.

Figure 6:
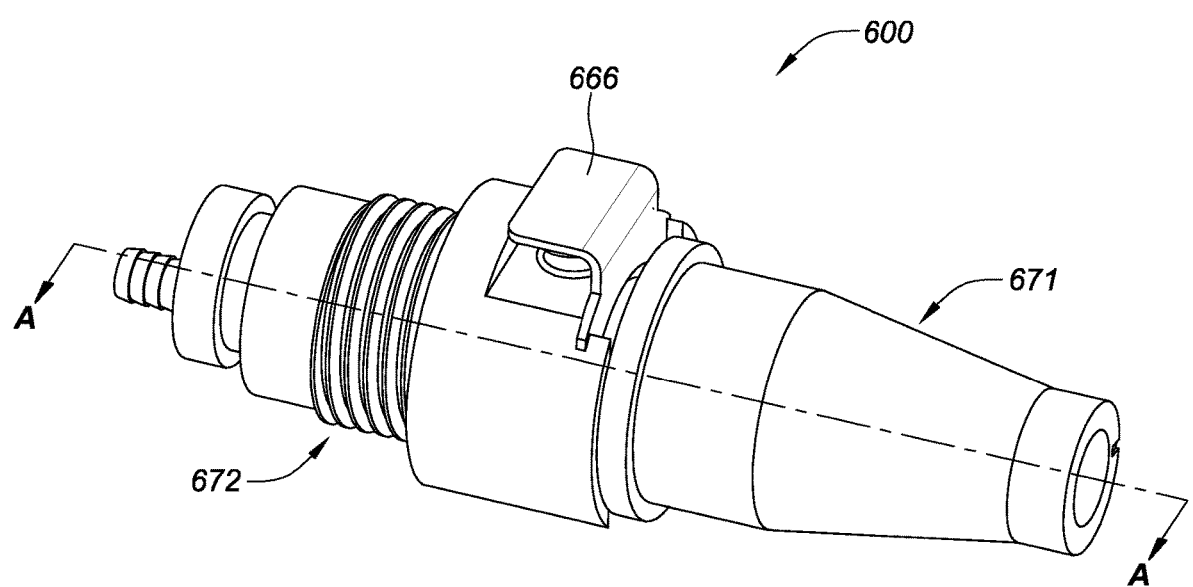
FIG. 6 is an isometric side view of an assembled system connector and catheter connector, consistent with various aspects of the present disclosure.

FIG. 6 is an isometric side view of assembled connectors 600 including system connector 672 and catheter connector 671, consistent with various aspects of the present disclosure. After completion of a therapy using the disposable catheter coupled to the catheter connector 671, a user may uncouple the assembly of the system and catheter connectors by depressing the connector lock release 666 and exerting a tensile force at the interface of the connectors.

Figure 6A:
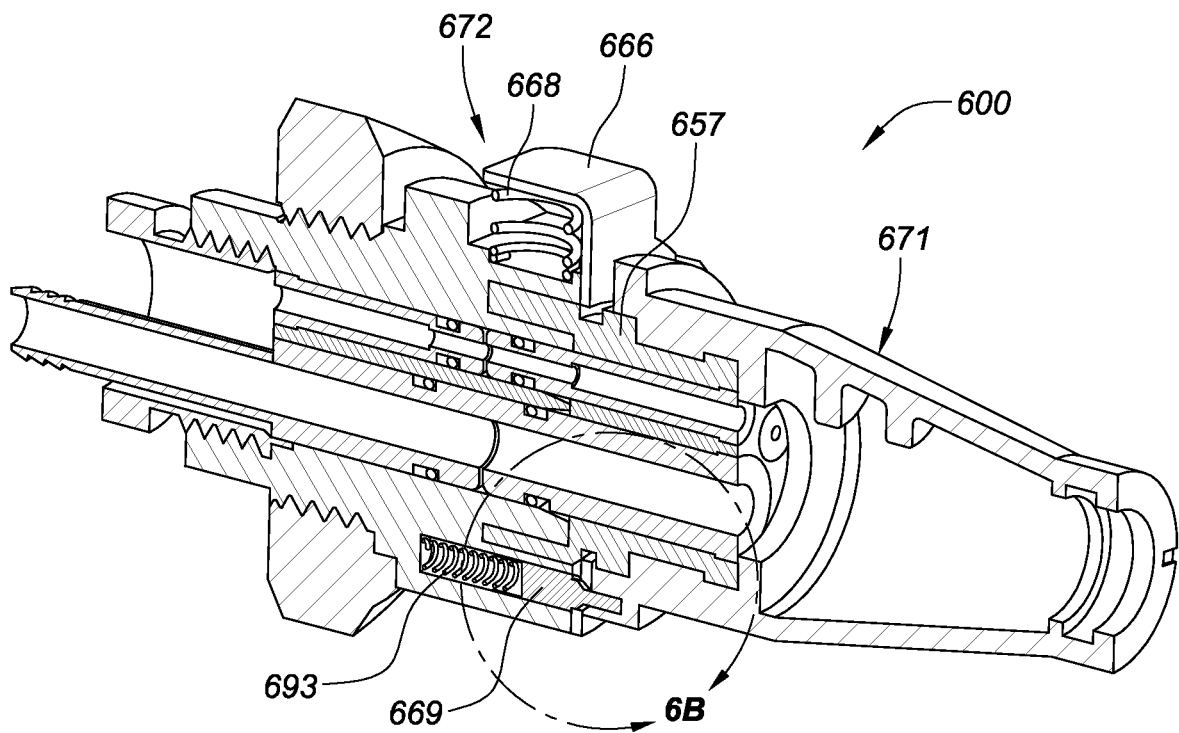
FIG. 6A is a cross-sectional side view of the assembled connectors of FIG. 6, consistent with various aspects of the present disclosure.
Figure 6B:
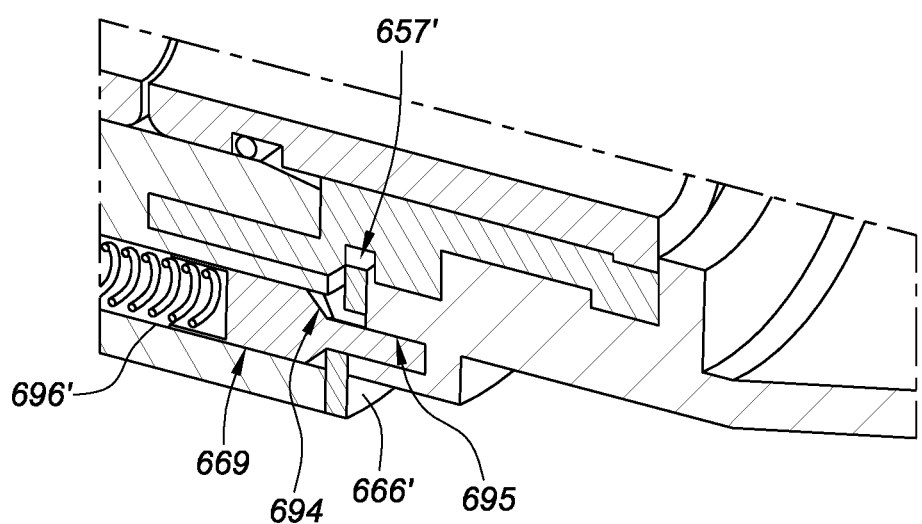
FIG. 6B is a close-up, cross-sectional side view of the assembled connectors of FIG. 6, consistent with various aspects of the present disclosure.

FIG. 6A is a cross-sectional side view of the assembled connectors 600 of FIG. 6, and FIG. 6B is a close-up cross-sectional side view of the assembled connectors 600 of FIG. 6, consistent with various aspects of the present disclosure. The assembled connectors 600 include a catheter connector 671 and system connector 672. The catheter connector 671 includes a connector housing 657 (and connectors) which extends into connector bores 592 (as shown in FIG. 5B) of the system connector 672. When assembled, the connectors 600 facilitate the flow of fluid through the various lumens that extend there through. With the catheter and system connectors coupled to one another, the locking pin 669 is depressed by overcoming the pin spring 693 force exerted thereon. With the locking pin 669 depressed, the unlocked stop surface 694 extends into bore 696' and out of contact with connector locking feature 666'. With the reduced diameter of a lock stop surface 695 aligned with the connector locking feature 666', locking spring 668 may drive the connector locking feature 666' upward without interference with unlocked stop surface 694. The connector locking feature 666' eventually coming into contact with lock ring grove 657' which prevents the removal of the catheter connector from the system connector without depressing connector lock release 666 to draw the connector locking feature 666' out of the lock ring grove 657'.

In some embodiments of the present disclosure, a locking mechanism may be located on a catheter connector as opposed to the system connector.

Ablation balloons have been developed for a variety of different applications and take a number of different forms. Aspects of the present disclosure may utilize ablation balloons of various types and different mechanical construction. The ablation balloons may be either of an electrically or thermally conductive material, and can be either self-erecting or mechanically erected, such as through the use of an internal balloon.

Pulmonary vein isolation balloon catheters as disclosed herein may be introduced into a patient's cardiovascular system via an introducer sheath (such as St. Jude Medical, Inc.'s Agilis™ NxT Steerable Introducer sheath).

Various catheter shaft designs consistent with the present disclosure may include a multi-lumen design which allows for input and output flows of cryogenic fluid, electrical lead wires, and guide wires for steering the distal end of the shaft. In some embodiments, three lumens may be radially offset within the shaft from a guidewire lumen. In yet other embodiments, all of the lumens may be radially and circumferentially distributed about a longitudinal axis of shaft.

Figure 7A:
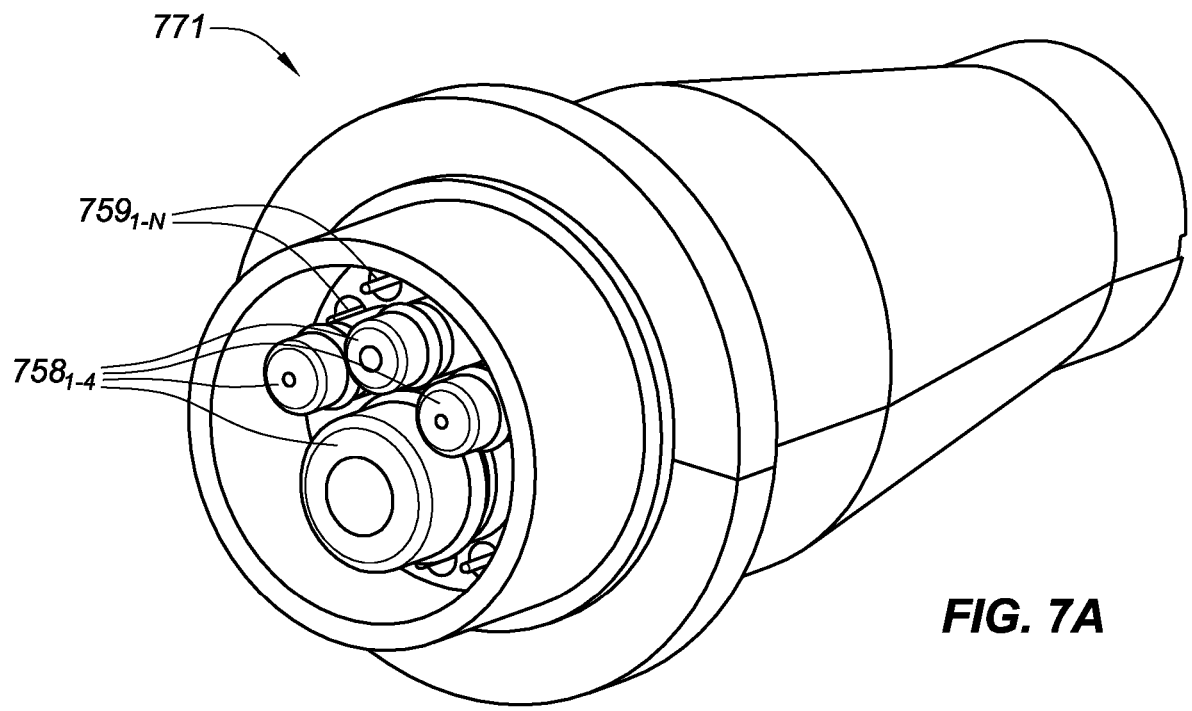
FIG. 7A is an isometric front view of a catheter connector, consistent with various aspects of the present disclosure.
Figure 7B:
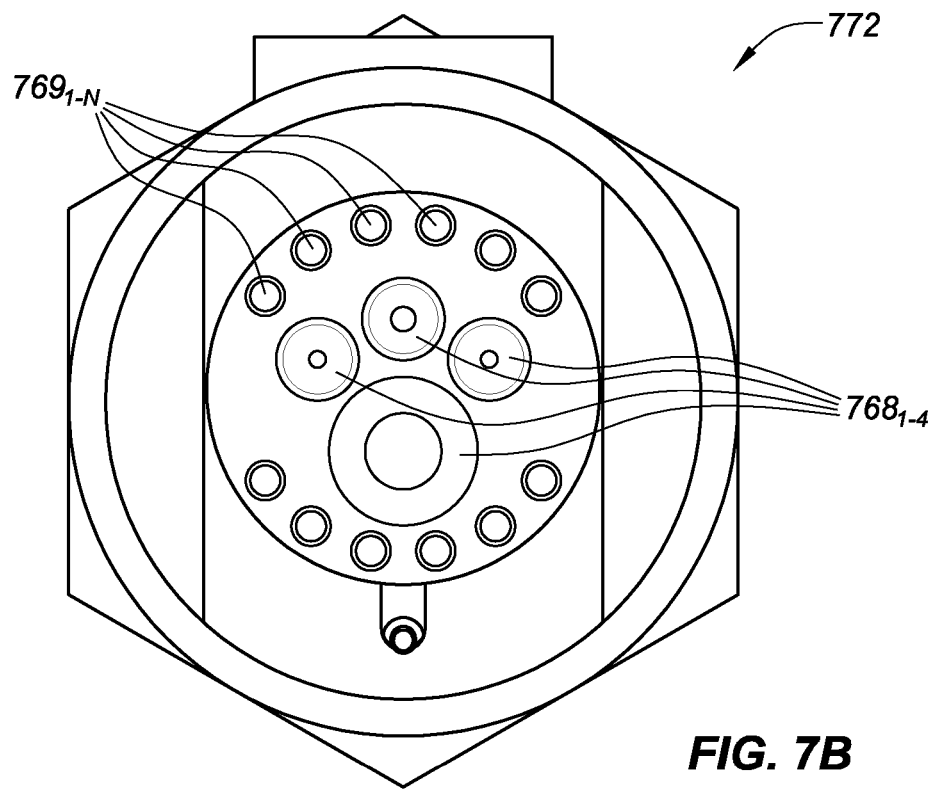
FIG. 7B is a front view of a system connector, consistent with various aspects of the present disclosure.

Various embodiments of the present disclosure contemplate catheter shafts, extension cables, catheter handles, catheter connectors, and system connectors that facilitate communication of fluids there through, but further include one or more electrical leads that facilitate electrical communication throughout an ablation catheter system, for example. In some embodiments, the electrical leads extending through the system connector, catheter connectors, catheter shaft, catheter handle, and/or extension cable may electrically couple thermocouples, pressure sensors, electrodes, etc. to controller circuitry. Similar to the embodiments disclosed in FIGS. 4-6B, the system and catheter connectors may include male and female electrical contacts which interface with one another when the system and catheter connectors are mated. For example, FIG. 7A is an isometric front view of a catheter connector assembly 771 including one or more male fluid connectors $758_{1-4}$ and one or more male electrical contacts $759_{1-N}$. The male fluid connectors and male electrical contacts on the catheter connector assembly 771 are configured to mate with female fluid connectors $768_{1-4}$ and female electrical contacts $769_{1-N}$ on a system connector assembly 772, as shown in FIG. 7B.

In various embodiments of the present disclosure, an ablation balloon is capable of conducting ablation therapy at more than one location of the ablation balloon. For example, energy can be delivered to a proximal, distal, or intermediary portion of the ablation balloon. In some embodiments, the proximal, distal, intermediary portions, or combinations thereof may simultaneously conduct ablation therapy. In more specific embodiments, the amount of ablation therapy (e.g., energy transmitted to the tissue) conducted at a tissue location may be controlled individually.

Based upon the above discussion and illustrations, those skilled in the art will readily recognize that various modifications and changes may be made to the various embodiments without strictly following the exemplary embodiments and applications illustrated and described herein. Such modifications do not depart from the true spirit and scope of various aspects of the disclosure, including aspects set forth in the claims.

Although several embodiments have been described above with a certain degree of particularity to facilitate an understanding of at least some ways in which the disclosure may be practiced, those skilled in the art could make numerous alterations to the disclosed embodiments without departing from the scope of the present disclosure and the appended claims. It is intended that all matter contained in the above description or shown in the accompanying drawings shall be interpreted as illustrative only and not limiting. Accordingly, the examples and embodiments herein should not be construed as limiting the scope of the disclosure. Changes in detail or structure may be made without departing from the present teachings. The foregoing description and following claims are intended to cover all such modifications and variations.

Additional information and examples can be found in U.S. provisional application No. 62/432,065, filed on 9 Dec. 2017; U.S. provisional application No. 62/578,352 filed 27 Oct. 2017; U.S. provisional application No. 62/578,201 filed 27 Oct. 2017; U.S. provisional application No. 62/578,325 filed 27 Oct. 2017; and U.S. provisional application No. 62/578,178 filed 27 Oct. 2017, each of which is hereby incorporated by reference as if set forth fully herein.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements may not have been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

The terms "including," "comprising" and variations thereof, as used in this disclosure, mean "including, but not limited to," unless express specified otherwise. The terms "a," "an," and "the," as used in this disclosure, means "one or more," unless expressly specified otherwise.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation.

Although process steps, method steps, algorithms, or the like, may be described in a sequential order, such processes, methods, and algorithms may be configured to work in alternative orders. In other words, any sequence or order of steps that may be described does not necessarily indicate a requirement that the steps be performed in that order. The steps of the processes, methods, and algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

It will be appreciated that the terms "proximal" and "distal" may be used throughout the specification with reference to a clinician manipulating one end of an instrument used to treat a patient. The term "proximal" refers to the portion of the instrument closest to the clinician and the term "distal" refers to the portion located furthest from the clinician. However, surgical instruments may be used in many orientations and positions, and these terms are not intended to be limiting and absolute. All other directional or spatial references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosure. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. An ablation catheter system comprising:
   a catheter shaft comprising a proximal end and a distal end;
   a catheter handle coupled to the proximal end of the catheter shaft, the catheter handle comprising one or more actuators configured to manipulate the distal end of the catheter shaft;
   a connector assembly coupled to a proximal end of the catheter handle, the connector assembly comprising:

one or more connectors to couple the catheter handle to a capital equipment for fluid communication; and a locking element configured to engage a connector locking feature that locks the connector assembly to a system connector coupled between the connector assembly and the capital equipment, wherein the locking element includes a lock ring groove that extends circumferentially along an entire circumference of an outer diameter of the connector assembly, the lock ring groove defined by two radially extending side walls and a bottom wall that faces radially outward, the bottom wall extending between the two radially extending side walls; and the system connector comprising:

the connector locking feature, wherein the connector locking feature is configured to extend radially inward into the lock ring groove towards the bottom wall; and a connector lock release coupled to the connector locking feature, wherein the connector lock release is configured to translate the connector locking feature radially outward out of the lock ring groove when the connector lock release is depressed radially inward.

2. The ablation catheter system of claim 1, further including the capital equipment, wherein the system connector and the connector assembly are configured to facilitate the communication of fluids therebetween when locked to one another.

3. The ablation catheter system of claim 2, wherein the connector locking feature is configured to maintain the coupling of the system connector and the connector assembly absent an unlocking force.

4. The ablation catheter system of claim 1, wherein the catheter handle includes a bellows, and an extension cable that extends between the proximal end of the catheter handle and the connector assembly, the bellows is positioned between the proximal end of the catheter shaft and the extension cable, the bellows configured to fluidly couple the catheter shaft to the extension cable.

5. The ablation catheter system of claim 4, further comprising a cryogenic ablation balloon, wherein the catheter shaft includes a guidewire lumen, the catheter handle includes an inner support structure that is configured to couple the catheter shaft to the catheter handle, and the guide wire lumen is coupled to a slide configured to freely slide along a longitudinal axis of the catheter handle, a distal portion of the guidewire lumen coupled to either a distal portion of the catheter shaft or a portion of the cryogenic ablation balloon, the slide further configured to adjust a relative coaxial position of the guidewire lumen relative to the catheter shaft in response to inflation and/or deflation of the cryogenic ablation balloon, and where movement of the slide further changes a volume of the bellows.

6. The ablation catheter system of claim 4, further including a thermocouple placed within the bellows, the thermocouple configured to detect a cooling within the bellows associated with a phase change of a cryogenic fluid within the bellows.

7. The ablation catheter system of claim 1, further comprising an exhaust lumen including one or more lumens routed therethrough.

8. The ablation catheter system of claim 1, further comprising a locking pin and a pin spring interfacing with the locking pin, the locking pin includes an un-locked stop surface and a lock stop surface;

wherein:

during coupling of the connector assembly to the system connector, to interface with the connector assembly at a distal tip of the locking pin, which in response to the interface exerts a force on the pin spring which deforms facilitating a retraction of the pin disengaging a contact point between the connector locking feature and the un-locked stop surface of the locking pin, engaging a second contact point between the connector locking feature and the lock stop surface, the difference in diameter between the two circumferential surfaces facilitates a vertical motion of the connector locking feature in response to a force exerted thereon by the locking spring, and as a result the connector locking feature engages with the lock ring groove of the connector assembly; and in response to an unlocking force on the connector lock release and the force exerted by the locking spring being overcome, to allow the connector locking feature to disengage the lock ring groove of the connector assembly, as the connector assembly decouples from the system connector the locking pin, in response to the force exerted by the pin spring, extends, disengaging the second contact point between the connector locking feature and the lock stop surface and reengaging the contact point between the connector locking feature and the un-locked stop surface which holds the connector locking feature in an unlocked position.

9. The ablation catheter system of claim 1, further comprising a cryogenic ablation balloon, wherein the cryogenic ablation balloon includes an inner balloon and an outer balloon, an interstitial space between the inner balloon and the outer balloon, and a manifold configured to deliver cryogenic fluid to an internal cavity of the inner balloon.

10. The ablation catheter system of claim 9, wherein the interstitial space is configured and arranged to capture cryogenic fluid that escapes the inner balloon; and the ablation catheter system further includes a vacuum lumen that extends a length of the catheter shaft and into fluid communication with the interstitial space at a first end of the vacuum lumen and a vacuum source at a second end of the vacuum lumen, the vacuum lumen configured to draw a vacuum within the interstitial space and to draw the captured cryogenic fluid out of the interstitial space, a cryogenic fluid tank, and a cryogenic fluid lumen in fluid communication with the cryogenic fluid tank at a second end of the cryogenic fluid lumen, the cryogenic fluid lumen extends through the length of the catheter shaft and into fluid communication with the manifold at a first end of the cryogenic fluid lumen.

11. The ablation catheter system of claim 1, wherein the system connector further comprises a locking spring that biases the connector lock release radially outward.

* * * * *